United States Patent [19]
Aoyama et al.

[11] Patent Number: 5,694,246
[45] Date of Patent: Dec. 2, 1997

[54] METHOD OF MANUFACTURING LENS ARRAY

[75] Inventors: Shigeru Aoyama, Kyoto; Masayuki Shinohara, Takatsuki, both of Japan

[73] Assignee: Omron Corporation, Kyoto, Japan

[21] Appl. No.: 471,187

[22] Filed: Jun. 6, 1995

Related U.S. Application Data

[62] Division of Ser. No. 176,440, Jan. 3, 1994, Pat. No. 5,536,455.

[51] Int. Cl.$^6$ .................................................. G02B 27/10
[52] U.S. Cl. ................................................ 359/619; 359/622
[58] Field of Search ............................... 359/618, 619, 359/622, 623

[56] References Cited

U.S. PATENT DOCUMENTS

| Re. 26,506 | 12/1968 | Rogers | 359/622 |
|---|---|---|---|
| 1,263,065 | 4/1918 | Johanson | 359/622 |

FOREIGN PATENT DOCUMENTS 3-190166   8/1991   Japan .

OTHER PUBLICATIONS

Z. Popovic et al. "Technique for monolithic fabrication of microlens arrays", Applied Optics, vol. 27, No. 7, 1 Apr. 1988, pp. 1281–1284.

N. Borrelli et al., "Photolytic technique for producing microlenses in photosensitive glass", Applied Optics, vol. 24, No. 16, 15 Aug. 1985, pp. 2520–2525.

N. Craft et al., "Optical interconnects based on arrays of surface-emitting lasers and lenslets", Applied Optics, vol. 31, No. 11, 10 Apr. 1992, pp. 1735–1739.

K. Iga et al., "Stacked planar optics: an application of the planar microlens", Applied Optics, vol. 21, No. 19, 1 Oct. 1982, pp. 3456–3460.

Kawai, "Microlens integral with plane-type optical element," Optronics, No. 1, 1993, pp. 86–93.

Nishizawa, "Microlens of distributed refractive index type," Optical Alliance, 1993. 2., pp. 34–38.

*Primary Examiner*—Scott J. Sugarman
*Attorney, Agent, or Firm*—Foley & Lardner

[57] ABSTRACT

A method of manufacturing a lens array according to the invention is presented wherein a first array of first lens-base elements is formed on a substrate with spacing therebetween. The first lens-base elements are heated so that the first lens-base elements melt to form first lenses having round surfaces. A separation layer is formed to cover the first lenses and the substrate. A second array of second lens-base elements is formed, the second lens-base elements being placed on a region where the first lenses are not formed so as to partly overlap with the first lenses. The second lens-base elements are also heated so that the second lens-base elements melt to form second lenses having round surfaces. The lens array comprises the substrate and the first and second lenses.

17 Claims, 23 Drawing Sheets

5,694,246

METHOD OF MANUFACTURING LENS ARRAY

This is a division of application Ser. No. 08/176,440, filed on Jan. 3, 1994 now U.S. Pat. No. 5,536,445.

BACKGROUND OF THE INVENTION

1. Field of the Invention

The present invention relates to a method of manufacturing a lens array, particularly a microlens array having a plurality of microlenses arranged two-dimensionally or one-dimensionally, and further to the lens array and application thereof.

2. Description of the Related Art

Characteristics required for each lens in a lens array are a focusing function of focusing light on a point and light utilization efficiency.

One of techniques for fabricating a lens array is a melting method (see, Zoran et al. "Technique for monolithic fabrication of microlens arrays", APPLIED OPTICS, Vol. 27, No. 7, 1 Apr., 1988, pp 1281-1284). According to this technique cylinders are formed using photoresist on circular pedestals and are heated. The cylinder material melts and flows to the pedestal to form the array of spherical microlenses.

The microlenses have spherical surfaces so that a good focusing function is obtained. However since the apertures of the microlenses are circles, the arrangement has spacing between the microlenses. The upper limit of light utilization efficiency is almost 80%.

SUMMARY OF THE INVENTION

An object of the present invention is to achieve both a good focusing function and high light utilization efficiency.

Another object of the present invention is to provide a method of manufacturing a lens array achieving the above objectives.

Still another object of the present invention is to provide a lens array achieving the above objectives and application of the lens array.

A method of manufacturing a lens array according to the present invention comprises the steps of: forming a first array of first lens-base elements on a substrate with spacing therebetween; heating the first lens-base elements so that the first lens-base elements melt to form first lenses; forming a second array of second lens-base elements in a place lacking of the first lenses so as to partly overlap with the first lenses; and heating the second lens-base elements so that the second lens-base elements melt to form second lenses.

The steps of forming and heating the second lens-base elements are repeated, if necessary.

In order to protect the first lenses in the heating step for forming the second lenses, a separation layer for covering the first lenses and the substrate is formed in one embodiment of the present invention.

According to another embodiment of the present invention, a material of the second lens-base elements different from that of the first lens-base elements is used.

In still another embodiment of the present invention, a replica of the lens array having at least the first lenses is made and the second lens-base elements are formed on the replica.

According to the present invention, the shape of the lenses may be a circle, an ellipse or other arbitrary shapes.

Since the shape of the lenses can be a circle, the lenses have spherical surfaces. Since the first lenses have spherical surfaces and the second lenses partly overlap with the first lenses, the second lenses also have spherical surfaces. An aberration is small and a good light focusing function is obtained.

The second lenses partly overlap with the adjacent first lenses. Accordingly there are no spaces or gaps where a lens is not disposed or the space can be very small. Light utilization efficiency of about 100% can be achieved.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Two-Dimensional Lens Array (Standard Type)

Process steps for fabrication of a two-dimensional microlens array are schematically depicted in FIGS. 1a to 1i. Intermediate products and a final product in some process steps are illustrated in FIGS. 2a through 2e, in which all of lens-base elements and lenses are not illustrated, but only a representative part of them is depicted.

Figure 1A:
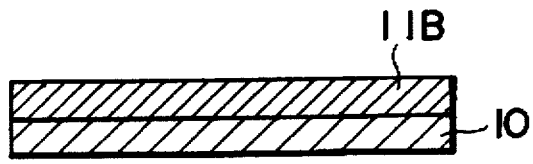
FIGS. 1a to 1i show processes for fabricating a lens array.

At the first step, a film or layer of photo-sensitive synthetic resin, for example, a positive photoresist 11B is formed on a substrate 10 (e.g., SiO₂ (glass) or Si substrate) by spin coating (see FIG. 1a).

Figure 1B:
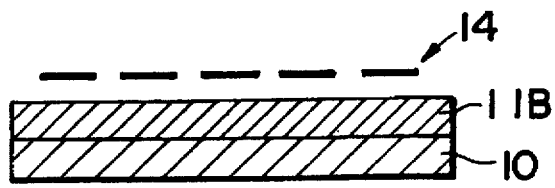
Figure 1C:
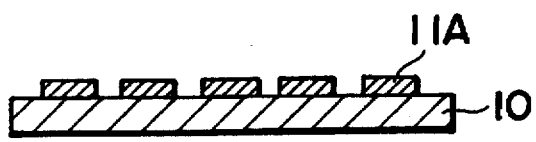
Figure 1D:
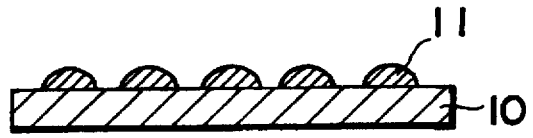

Next, a mask 14 is placed on or above the positive photoresist layer 11B and the photoresist layer 11B is exposed by light through openings formed on the mask 14 (see FIG. 1b). The mask 14 has portions for shielding the light, the portions having a shape corresponding to the lens-base elements to be formed.

By developing the photoresist, the lens-base elements 11A made of the photoresist remain on the substrate 10. The lens-base elements 11A are a thin and cylindrical shape (see FIGS. 1c and 2a). The lens-base elements 11A are exposed to near ultraviolet (UV) radiation to lower the melting temperature of the elements, if necessary.

The substrate 10 and the lens-base elements 11A are heated or baked to above the melting temperature of the photoresist material, e.g., to 140° C. or 150° C. The material of the lens-base elements melts to form the first spherical microlenses 11 (see FIGS. 1d and 2b). The upper surface of the molten material is rounded due to the surface tension of the molten material but does not flow due to the surface tension. The diameter of the microlens 11 is the same as that of the lens-base element 11A. However, the diameter of the microlens 11 may be larger than that of the lens-base element 11A depending on the temperature condition, especially when the temperature becomes higher. Anyway the diameter of the microlens 11 is controllable.

For convenience of explanation, first parallel dot-and-dash lines (first partitioning center lines) at a first constant interval (a pitch P), and second parallel dot-and-dash lines (second partitioning center lines) at the same interval (a pitch P) as the first interval are assumed and illustrated in FIGS. 2a to 2e, the first lines are perpendicular to the second lines. The lens-base elements 11A are so positioned that the center of the elements 11A coincide with the intersecting points (node) of the first and second lines. The lens-base elements 11A disposed along one line are so arranged that the elements 11A are positioned on every other intersecting points. The lens-base elements 11A disposed along one line are shifted from the lens-base elements 11A disposed along another line adjacent to said one line by one pitch P.

The diameter r of the lens-base element 11A is larger than the pitch P, but the lens-base elements 11A adjacent to each other are not made into contact with each other as described later. That is, each of the elements 11A are isolated from one another. There are spaces or gaps between the adjacent elements 11A. The same is true of the lenses 11.

Figure 1E:
Figure 2A:
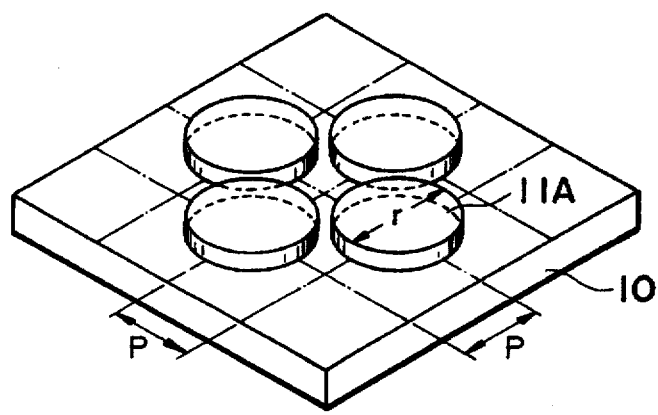
FIGS. 2a to 2e are perspective views for showing processes of fabricating the lens array.
Figure 2B:
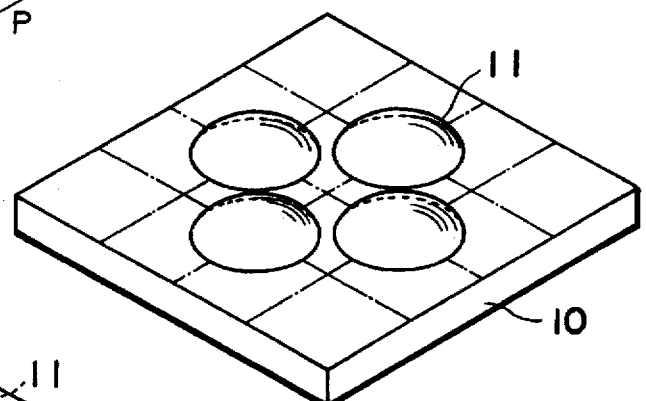
Figure 2C:
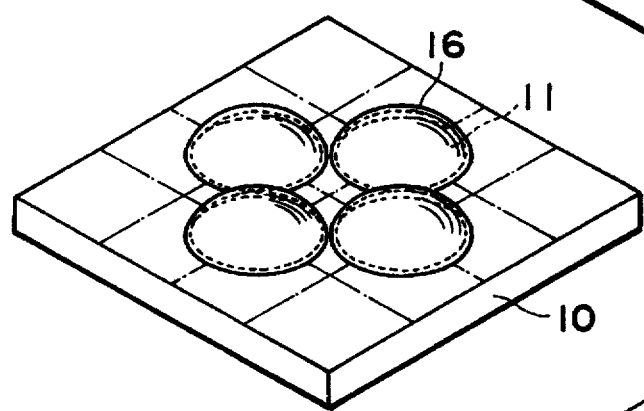

After formation of the first microlenses 11, a separation layer or film (intermediate layer or film) 16 is formed to cover the first lenses 11 and the upper surface of the substrate 10 (see FIGS. 1e and 2c). For example, the separation layer 16 is formed by accumulating inorganic material such as SiO₂, Cr by sputtering or deposition technology. The thickness of the layer 16 is less than about 1 μm.

Figure 1F:
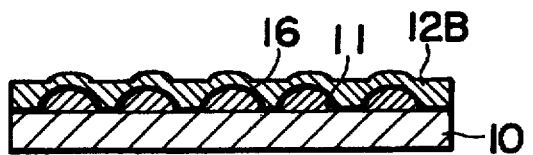

A photo-sensitive synthetic resin (e.g., positive photoresist) layer 12B is formed on the separation layer 16 (see FIG. 1f). This layer 12B may be made of the same material as that of the layer 11B.

Figure 1G:
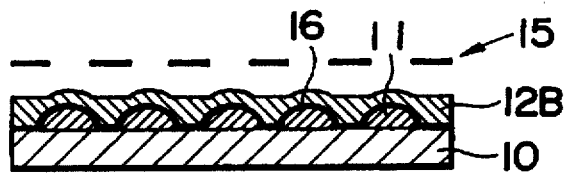

The positive photoresist layer 12B is subject to exposure through mask 15 having square light-shielding portions (see FIG. 1g).

Figure 1H:
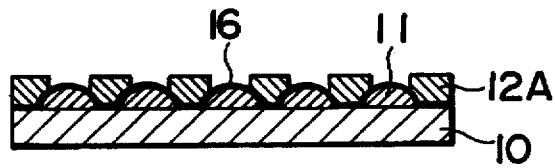
Figure 2D:
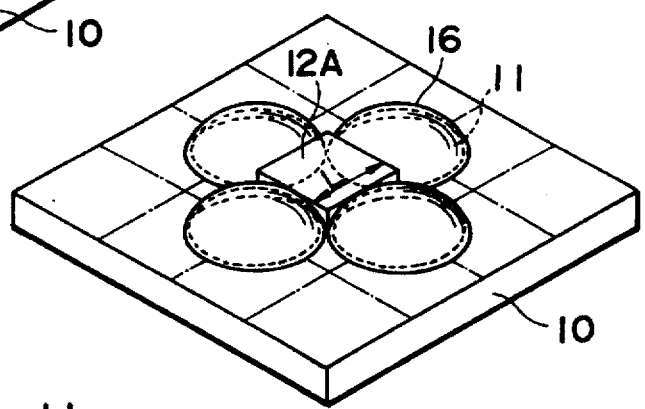

After development of the second photoresist 12B on the separation layer 18, second lens-base elements 12A having thin square pillar shapes appear (see FIGS. 1h and 2d). As seen from FIG. 2d, the lens-base elements 12A are positioned at the intersecting points of the first and second lines where no first lenses 11 exist and the center of the elements 12A coincide with the intersecting point. The length L of a side of square element 12A is almost same as the pitch P. Side portions of the elements 12A overlap with the peripheral portions of the first lenses 11.

Finally, the elements 12A (and the lenses 11 and the substrate 10) are heated or backed. The lens-base elements 12A melt to form second microlenses 12 (see FIGS. 1i and 2e). The second microlenses 12 have also round and spherical surfaces.

The separation layer 16 has the function of protecting and keeping the shape of the first lens 11 in the processes of coating, exposure, development and melting of the second photoresist. The separation layer should be made of materials, which cannot be molten in the melting process of the second lens-base elements.

The first lenses 11 and second lenses 12 are overlapped to each other at their peripheral portions, and the substrate 10 is entirely covered by the first and second lenses 11, 12 (except for peripherals of the substrate). There are no portions that lack the lens function on the substrate 10, so that light utilization efficiency of about 100% is achieved.

The height of the first photoresist 11B is so determined so as to obtain the first lenses 11 having a desired thickness. The height of the second photoresist 12B is so determined so as to obtain the second lenses 12 having the same thickness as that of the first lenses 11.

Photolithography technique is utilized to fabricate the first and second lens-base elements in the above embodiment. However other techniques such as electron-beam (EB) lithography may be used, as well.

The two-dimensional lens array as described above can be used as is. In this case, transparent materials are used as the materials of the substrate, photoresist and separation layer.

Mass production is possible using a molding method that employs a mold (an injection molding method or molding method using a resin that is hardened by UV radiation).

Processes for manufacturing a stamper and for a two-dimensional lens array with use of the stamper are explained briefly hereinafter.

A nickel film is fabricated on the above described two-dimensional lens array serving as a master plate by use of an electroforming method. The master plate is then removed to obtain a nickel stamper comprising the nickel film. The nickel stamper has concaves corresponding to the first and second lenses 11, 12.

Subsequently, a molten UV-setting resin is filled between the nickel stamper and a transparent substrate and then the nickel stamper and the substrate are depressed against each other. An ultraviolet ray is irradiated through the transparent substrate to solidify the UV-setting resin.

Figure 1I:
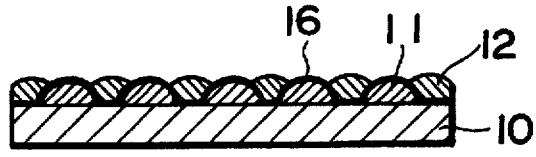
Figure 2E:
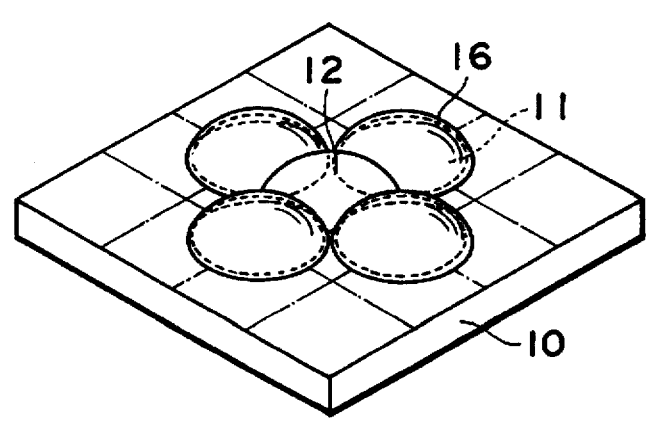

After the resin becomes stiff, the stamper is removed, thereby obtaining a two-dimensional lens array made of the UV-setting resin, formed on the transparent substrate and having the same configuaration as that of the two-dimensional lens array shown in FIGS. 1i and 2e.

In summary, the two-dimensional lens array shown in FIGS. 1i and 2e is fabricated by the first and second melting stages, the melting stage including a process of patterning the lens-base elements (by photolithography or EB lithography) and e process of melting the lens-base elements (by heating). The lens-base element 11A in the first melting stage has a circular shape when viewed from a plane, whereas the lens-base element 12A in the second melting stage has a square shape when viewed from a plane. The plane view of the lens-base element is called a lens aperture in this specification.

Figure 3:
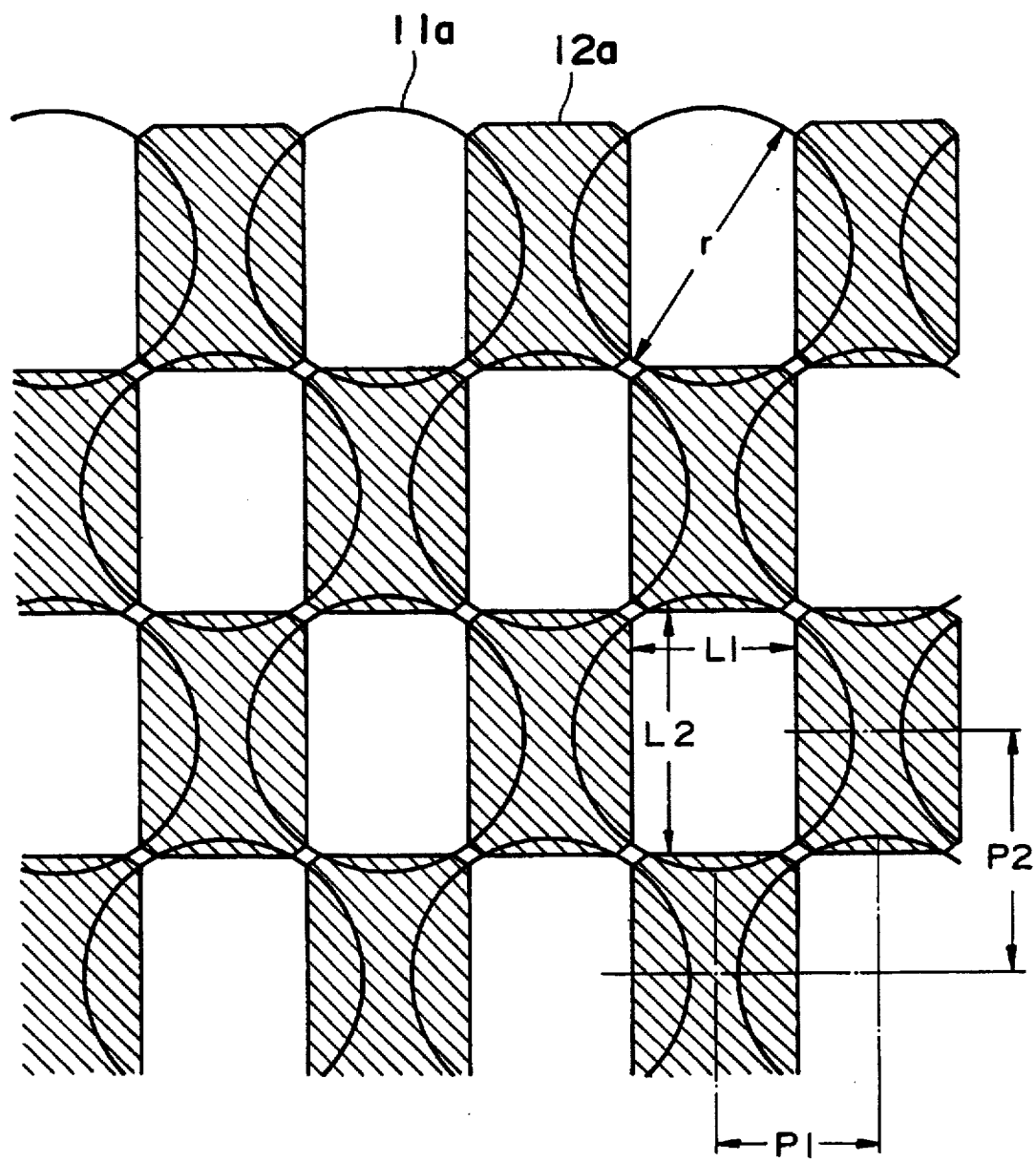
FIG. 3 shows a standard arrangement of a two-dimensional lens array.

FIG. 3 shows a general configuaration of lens apertures in the two-dimensional lens array. A pitch in one direction is P1 and a pitch in another direction perpendicular to the one direction is P2. FIGS. 2a to 2e show a special case where P1 is equal to P2.

The first lens aperture 11a in the first melting stage is formed to be a circle or almost circular shape. The lens apertures 11a should cover at least the length of shorter pitch, and be isolated from one another as described above. Accordingly, the diameter r of the lens aperture 11a is defined as follows:

$$\text{MIN } [P1, P2] < r < (P1^2 + P2^2)^{1/2} \qquad \text{Eg. (1)}$$

An operation MIN is one to select the smaller one of P1 and P2. The center of the circular lens aperture 11a is positioned on or near the intersecting point of the first and second partitioning center lines.

The second lens aperture 12a (indicated by hatching) in the second melting stage is formed to be a rectangle or rectangular shape with corners cut off. The lengthes L1 and L2 of sides of the rectangle lens aperture 12a are set to be equal to or nearly equal to P1 and P2, respectively, in order that the second lens overlaps with the first lens at their peripheral portions.

With above conditions, a two-dimensional lens array comprising a plurality of first and second lenses arranged regularly without gaps having no lenses occupies is obtained.

One-Dimensional Lens Array (Row of Lenses)

Figure 4:
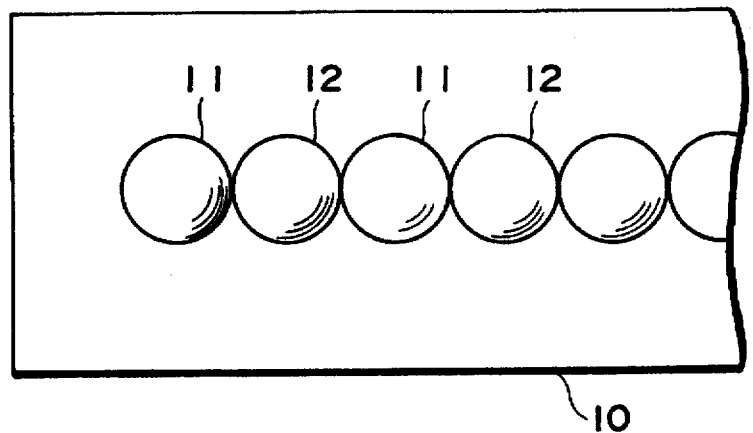
FIG. 4 is a plane view of a one-dimensional lens array.
Figure 5:
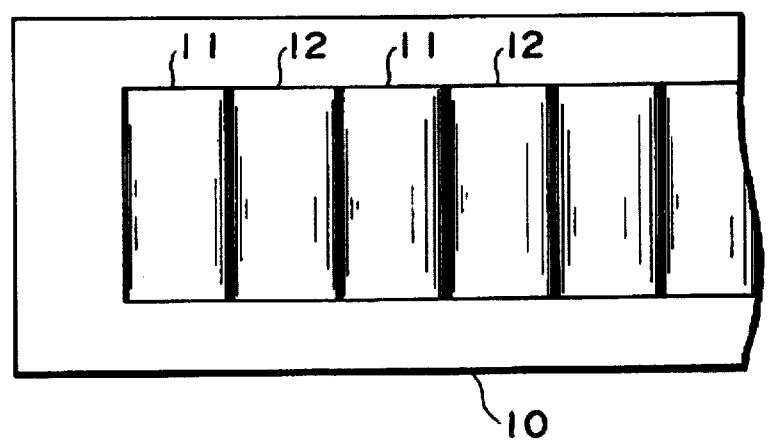
FIG. 5 is a plane view of another one-dimensional lens array.
Figure 6:
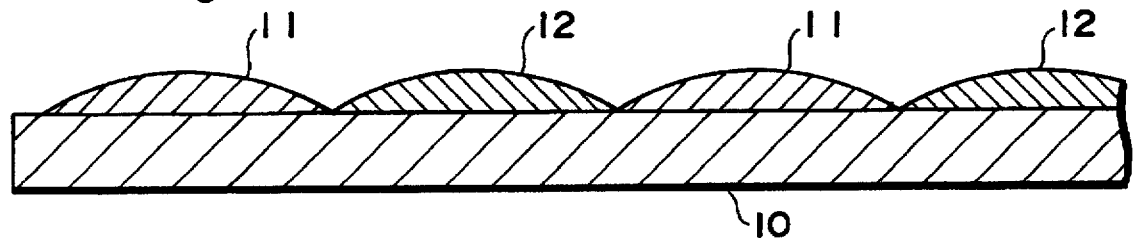
FIG. 6 is a longitudinal sectional view of the one-dimensional lens array shown in FIG. 4 or 5.

FIGS. 4 and 5 show examples of a one-dimensional lens array (a row of lenses). A plurality of microconvex lenses 11 and 12 are arranged in a row on a substrate 10 in FIG. 4. A plurality of micro-cylindrical lenses 11 and 12 are arranged in a row on a substrate 10 in FIG. 5. FIG. 6 is an enlarged cross sectional view taken along a center line of the row of lenses shown in FIG. 4 or 5.

In these figures the first lenses 11 disposed in every other positions are fabricated in the first melting stage. That is, the first lens-base elements are formed by photolithography with use of a first photo-sensitive material, e.g., a negative photoresist. The lens base elements then are melted by baking them.

The second lenses 12 are fabricated in the second melting stage. The second lens-base elements are formed by photolithography. The second lens-base elements are made of a second photo-sensitive material which is different from the first photo-sensitive material, e.g., a positive photoresist, so that the first lenses 11 are not affected in the process of development of the second lens-base elements, and the first lenses 11 and the second lenses 12 are not mixed with each other when the second lens-base elements are melted to form the second lenses 12 even if the second lens-base elements contact with the first lenses 11.

In this way, a row of lenses in which a plurality of lenses are arranged in a row without any gap therebetween is manufactured with two melting stages.

In a case where circular shaped concave lenses as shown in FIG. 4 are facricated, both the first and second lens-base elements are formed like a thin cylinder in shape.

Figure 7:
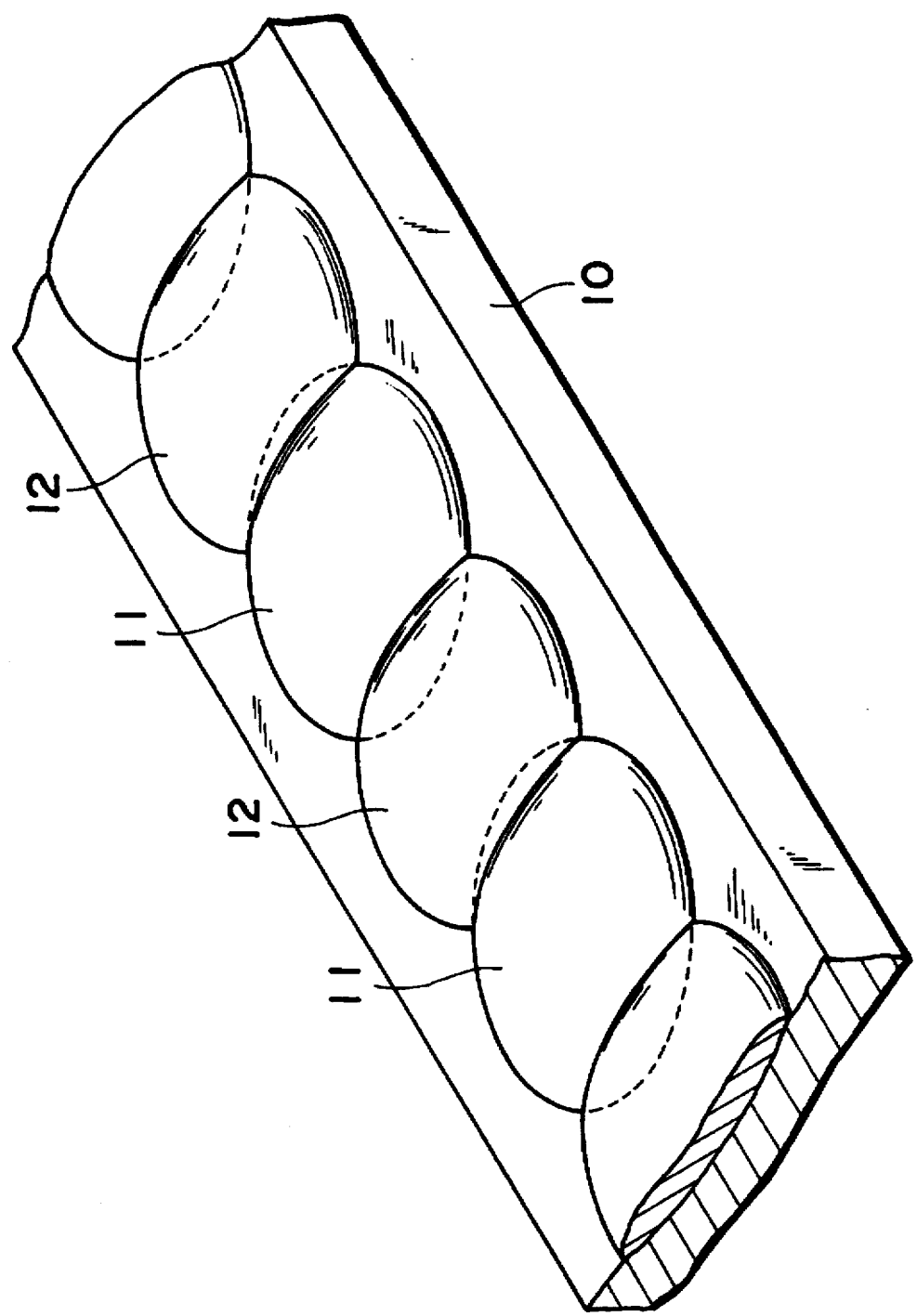
FIG. 7 is a perspective view of a one-dimensional lens array.
Figure 8:
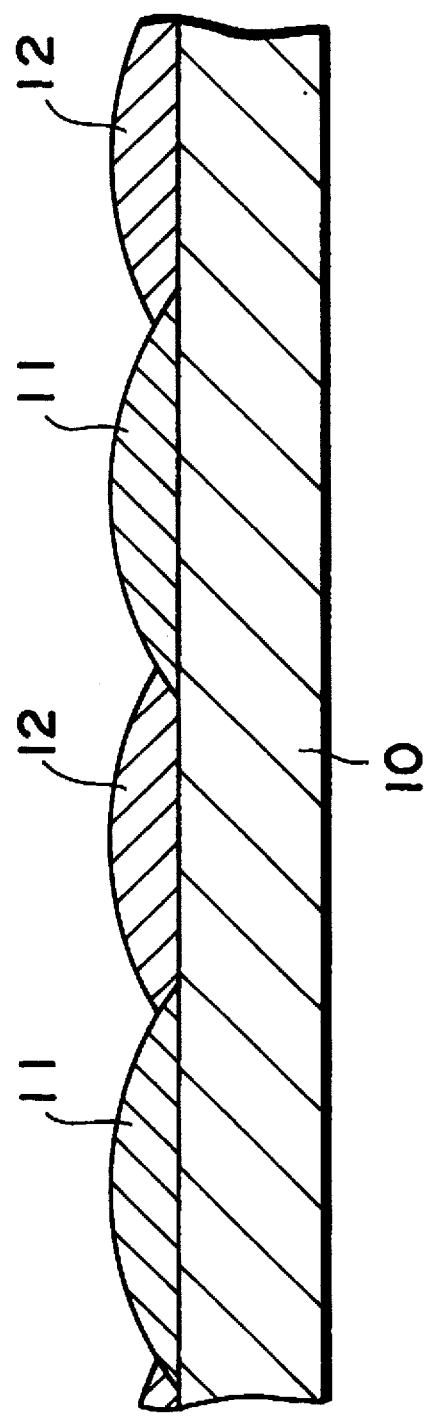
FIG. 8 is a sectional view of the one-dimensional lens array shown in FIG. 7.

FIGS. 7 and 8 show another example of a one-dimensional lens array. The first lenses 11 and second lenses 12 are overlapped to each other at their peripheral portions. The lens aperture of the first lenses 11 is a circle. The lens aperture of the second lenses 12 has a shape obtained by cutting straightly overlapped portions from a circle. The shape or form of the second lens aperture (and the third lens aperture when the third melting stage is necessary) will be exlained theoretically later.

It goes without saying that the one-dimensional lens array shown in FIGS. 4 to 8 are used as master plates to make stampers which are used in mass production of one-dimensional lens arrays.

Further the method of fabricating one-dimensional lens arrays shown in FIGS. 4 to 8, in which different materials are used for the first and second lenses, is applicable to the fabrication of the two-dimensional lens array as shown in FIGS. 1a to 3.

Figure 9:
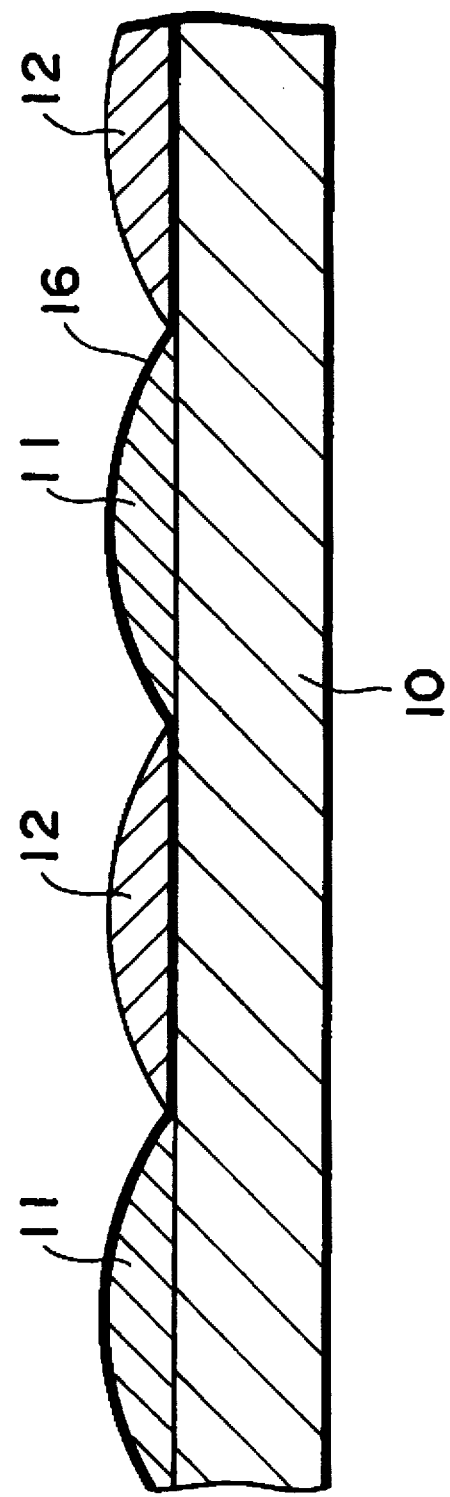
FIG. 9 is a sectional view of another one-dimensional lens array.

FIG. 9 shows a further example of a one-dimensional lens array. A separation layer 18 is used to protect the first lenses 11.

Figure 10:
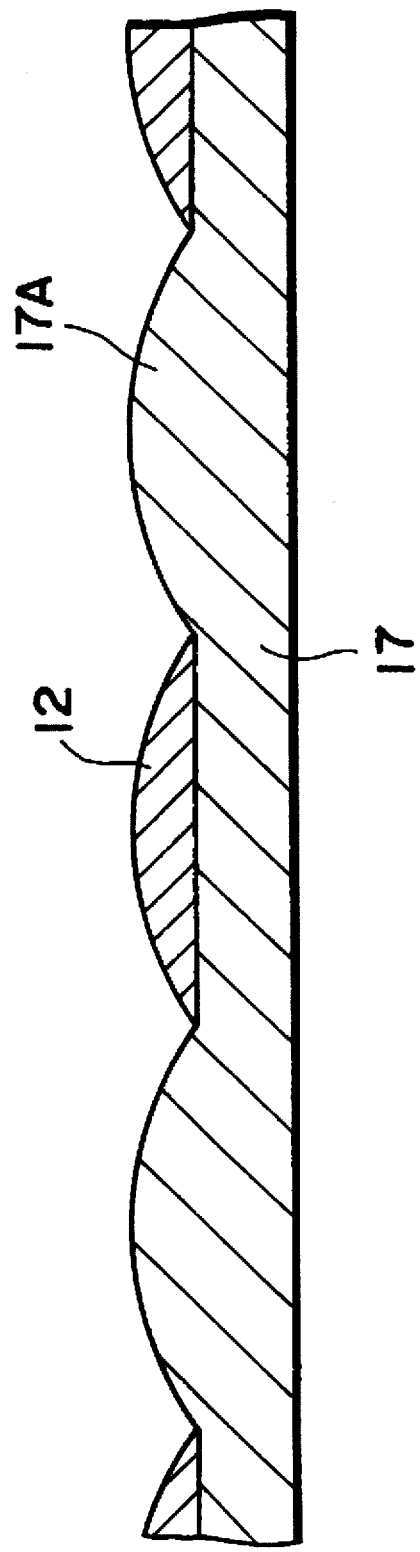
FIG. 10 is a sectional view of still another one-dimensional lens array.

FIG. 10 shows still another example of a one-dimensional lens array. The processes for fabricating this lens array are as follows:

After first lenses are formed on a first substrate, the first substrate with the first lenses is used as a master plate to make a nickel stamper. A molten resin, e.g., acrylic (acryl)-resin, is injected between the stamper and a second substrate and the resin is solidified by photo polymerization. A replica 17 made of the acrylic resin and having first lens portions 17A is obtained by removing the stamper and the second substrate.

Second lens-base elements are formed on the replica 17 at positions between the first lens portions 17A and are subject to the second melting process to be second lenses 12. The replica 17 is not molten in the second melting process.

The lens array thus fabricated may be used as is, and also may be used as a master plate for making a stamper with which another replica having first and second lens portions is manufactured.

The method of making the lens array as shown in FIG. 10 with the replica having the first lens portions is also applied to processes for making a two-dimensional lens array.

Theoretical Explanation and Various Arrangements

A boundary line (boarder line) between two lenses which are adjacent to and partly overlapped to each other is discussed hereinafter.

Figure 11:
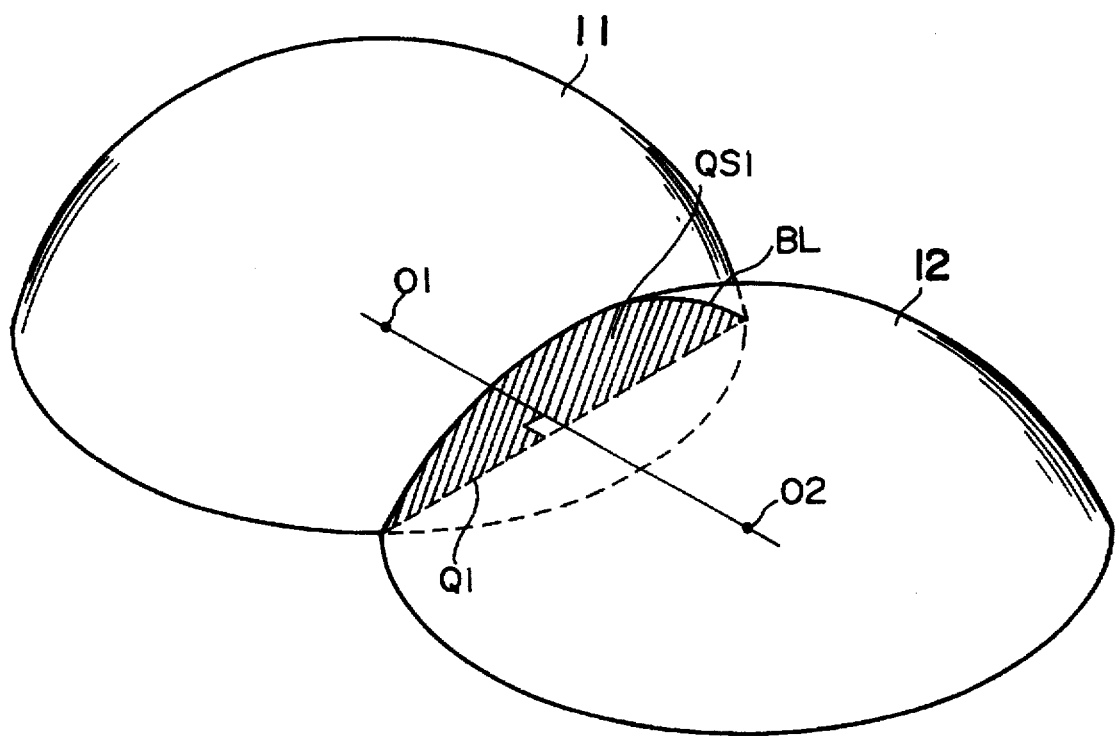
FIG. 11 is a perspective view for showing a boundary line between adjacent lenses.

As shown in FIG. 11, the boundary line Q1 in the bottom surfaces of the lenses 11 and 12 is ideally or desirably perpendicular at midpoint (perpendicular bisector) of a line (segment) which is drawn between a center point 01 of the lens 11 and a center point 02 of the lens 12. The boundary line BL in the upper surfaces of the lenses 11 and 12 is in a plane QS1 (hatched) which rises on the perpendicular bisector Q1 vertically to the bottom surfaces. The lens 11 formed in the first melting stage acts as a pedestal for regulating the height of the second lens 12 and the height of both lenses 11 and 12 becomes equal to each other at the boundary line BL. If both lenses 11 and 12 are ideally formed, they have no aberration or less aberration so that a good focusing function is achieved. This is the reason why the second lens-base elements 12A shown in FIGS. 1h and 2d are formed to have thin square pillar shapes.

Figure 12:
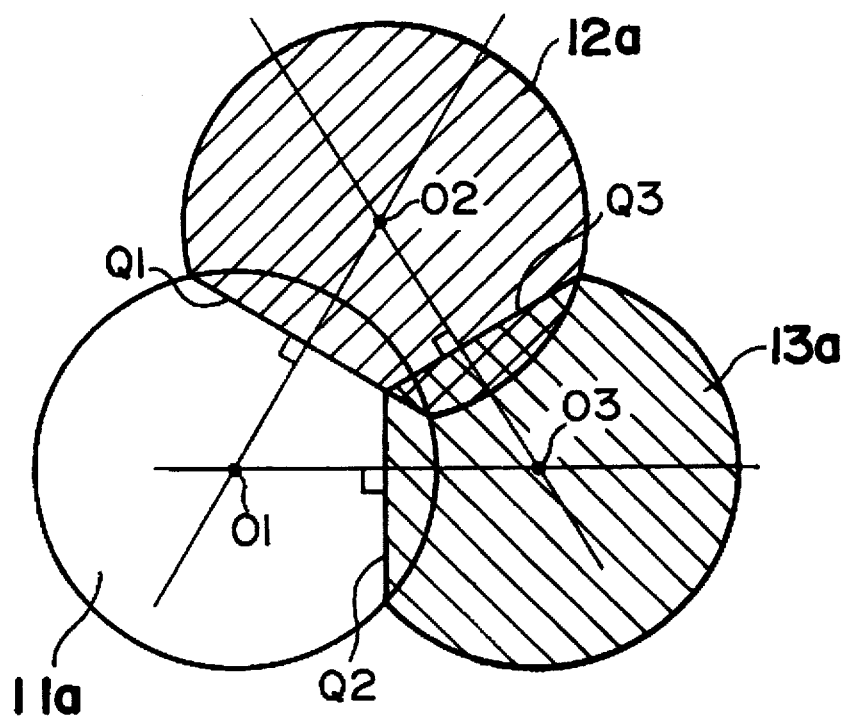
FIG. 12 also shows boundary lines among lenses.

FIG. 12 shows a first lens aperture 11a, second lens aperture 12a and third lens aperture 13a when a two dimensional lens array is fabricated through triple melting stages.

The lens aperture 11a of the first melting stage is a circle. The lens aperture 12a of the second melting stage (indicated by hatching) has a shape of a circle with a cutoff defined by a boundary line Q1 which is a perpendicular bisector of a segment between the center points 01 and 02 of the aperture 11a and 12a. The lens aperture 13a of the third melting stage (hatched doubly) is formed to be a circle having two cutoffs. The first cutoff is formed by cutting the circle along a boundary line Q2 which is a perpendicular bisector of a segment between the center points 01 and 03 of the apertures 11a and 13a. The second cutoff is formed by cutting the circle along a boundary line Q3 which is a perpendicular bisector of a segment between the center points 02 and 03 of the apertures 12a and 13a. As described above the lens apertures 11a, 12a and 13a are plane views of the lens-base elements of the first, second and third melting stages.

FIGS. 13a to 13e show examples of arrangements (arrays) of lenses. These figures do not intend to indicate shapes (contours) of lens apertures, but just show ways of arrangements of lenses.

Figure 13A:
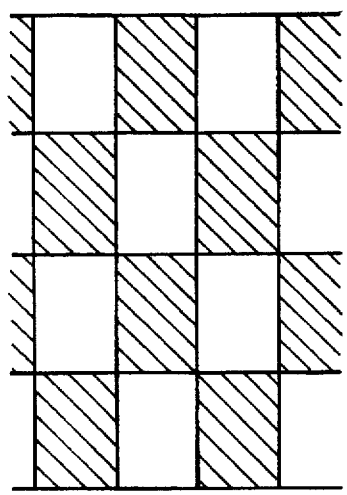
FIGS. 13a to 13e show examples of arrangements of lenses.

FIG. 13a shows a regular arrangement or a so-called mosaic arrangement.

FIGS. 13b, 13c, 13d and 13e show a so-called delta arrangement (so-called triangle-type arrangement or zigzag pattern).

The two-dimensional lens array shown in FIG. 3 is of the mosaic arrangement.

Figure 14:
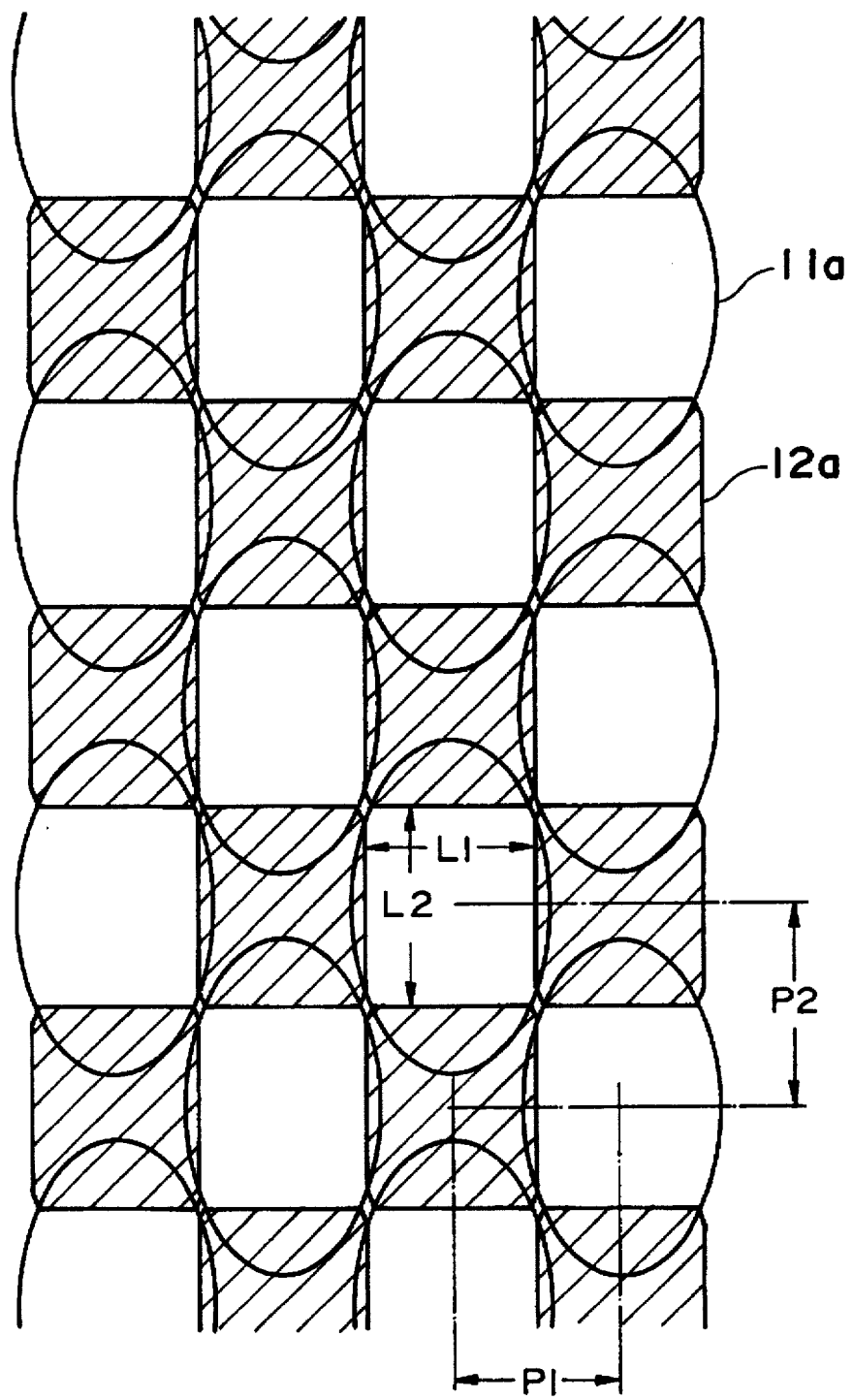
FIG. 14 shows an example of an arrangement of lens apertures.

Another example of a two-dimensional lens array of the mosaic arrangement is shown in FIG. 14.

The first lens aperture 11a is an ellipse in which the major axis is longer than the longer pitch P2 and the minor axis is longer than the shorter pitch P1. However the first lens apertures 11a are isolated from one another. The second lens aperture 12a is a rectangle or rectanglar shape with corners cut off. The lengthes L1 and L2 of the sides of the aperture 12a are equal to the pitches P1 and P2, respectively.

Each lens of the array shown in FIG. 14 has the characteristics of astigmatism. The lenses are arranged with no gap (or space) or small gap therebetween.

Figure 13B:
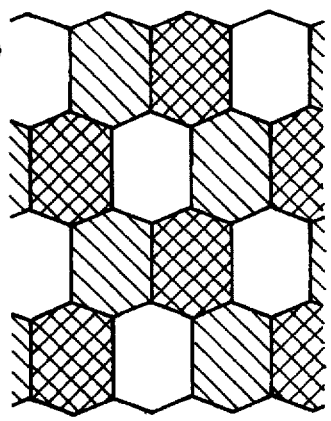
Figure 15:
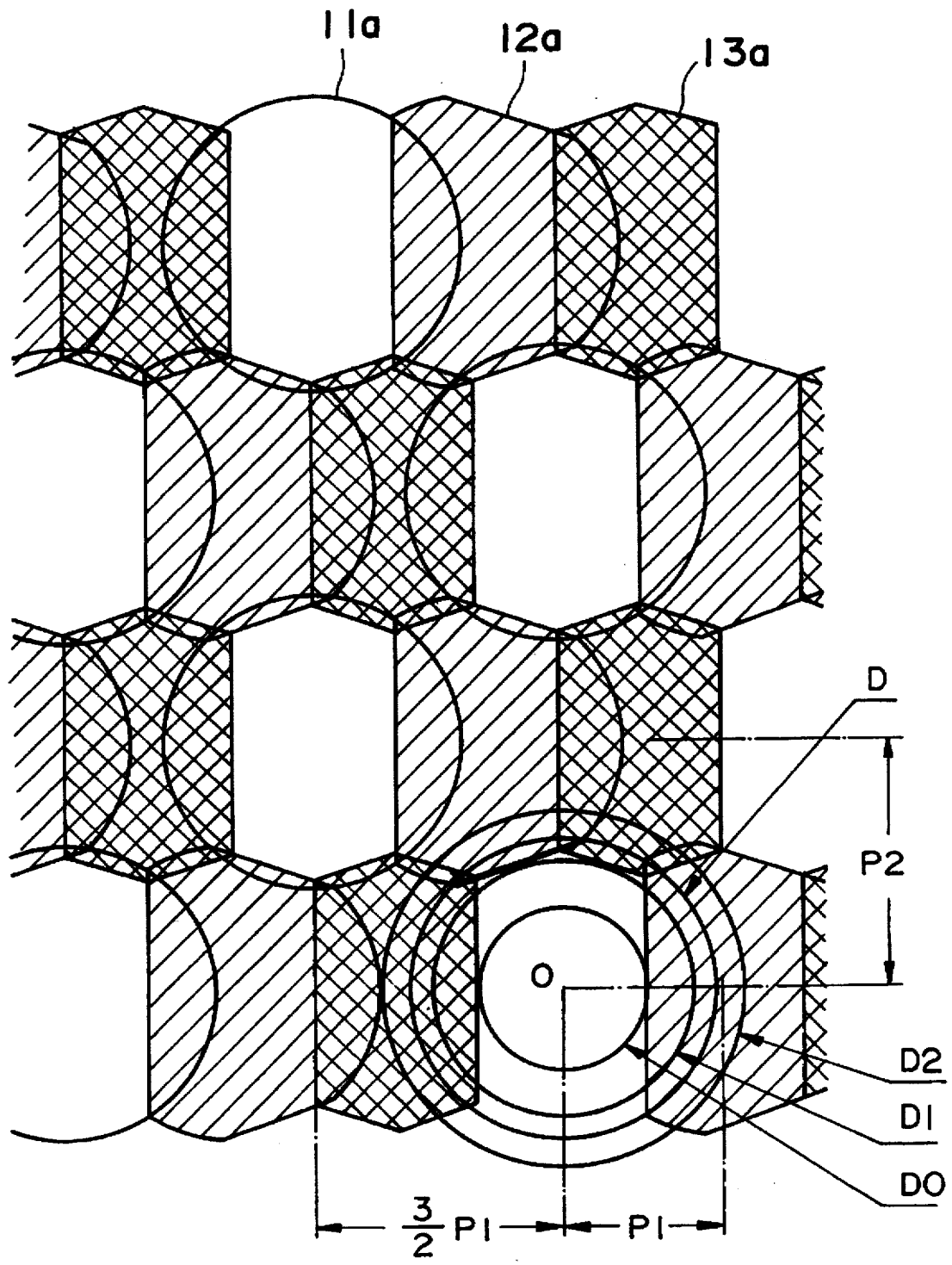
FIG. 15 shows an example of an arrangement of lens apertures.

FIG. 15 shows a two-dimensional lens array of the delta arrangement depicted in FIG. 13b.

This two-dimensional lens array is made by triple melting stages. The boundary lines of the apertures 11a, 12a and 13a are determined as explained with reference to FIGS. 11 and 12.

The first lens aperture 11a is a circle. The diameter of a circle defining the first lens aperture 11a is larger than a diameter of a circle which contacts with the second and third lens apertures 12a and 13a and is smaller than a diameter of a circle which does not contact with each other.

The diameter D of the circle defining the first lens aperture 11a is expressed as follows:

$$\text{MIN } [D0, D1] < D < D2 \qquad \text{Eg. (2)}$$

where
- D0: a diameter of a circle which contacts with the second and third apertures in a direction of the shorter pitch P1.
- D1: a diameter of a circle which contacts with the third aperture in a direction of the larger pitch P2, and
- D2: a diameter of a circle which contacts which another circle of the same diameter.

That is, $$D0 = P1 \qquad \text{Eg. (3)}$$

$$D1 = [(P\tfrac{1}{2})^2 + P2^2]^{1/2} \qquad \text{Eg. (4)}$$

$$D2 = [(3P\tfrac{1}{2})^2 + P2^2]^{1/2} \qquad \text{Eg. (5)}$$

The shape (contour) of the second lens aperture 12a comprises arcs and straight lines. The arcs are portions of a circle which has almost the same diameter of the circle defining the first lens aperture 11a and are drawn in a region where the second lens aperture 12a does not overlap with the first lens aperture 11a. The straight lines are drawn in a region where the second lens aperture 12a overlaps with the first lens aperture 11a. The straight lines are the boundary lines between the first and second lens apertures 11a and 12a, each of which connects both ends of the arcs.

The shape (or contour) of the third lens aperture 13a is a hexagon the vertexes of which are on the boundary lines between the first and the second lens apertures 11a and 12a.

The advantageous features of the lens array shown in FIG. 15 are that there is no gap (space) among lenses and the lenses show no aberration or less aberration.

This lens array is made by several methods.

A first method is to utilize a seperation layer twice. That is, after the first lenses are formed in the first melting stage, the first lenses are covered by a first separation layer. Then the second lenses are formed in the second melting stage. Thereafter the second lenses and the first separation layer are covered by a second separation layer. Finally, the third lenses are fabricated in the third melting stage.

A second method is that which utilizes a replica and a separation layer. The replica comprises a substrate portion and first lens potirons formed on the substrate portion integral therewith. The second lenses are formed on the replica in the second melting stage. After the second lenses are covered by a separation layer, the third lenses are formed in the third melting stage.

In the third method, a replica having first lens portions and second lens portions is formed. The third lenses are fabricated on the replica.

It goes without saying that replicas are manufactured using as a master plate the lens array fabricated by the above discussed methods.

Figure 16:
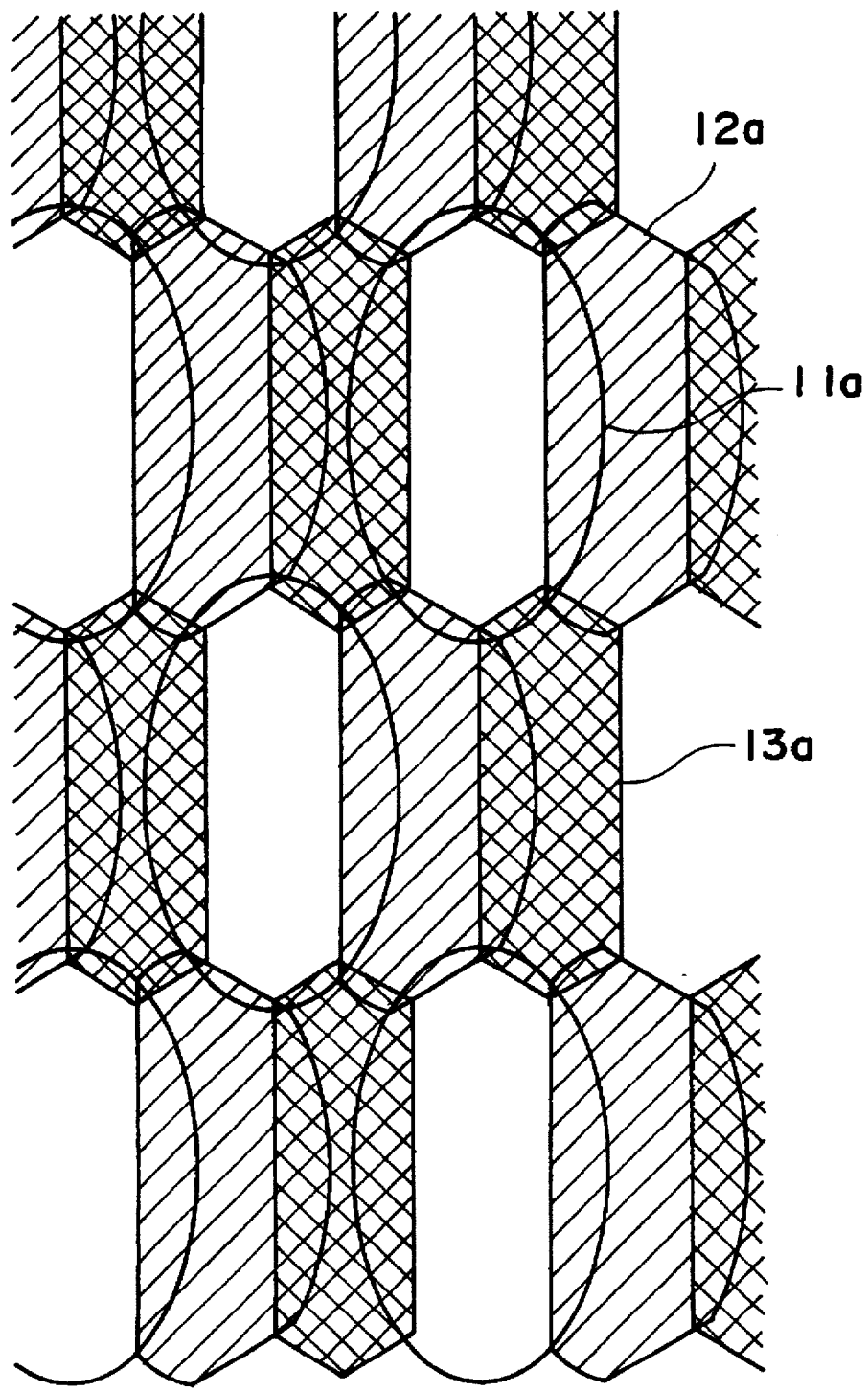
FIG. 16 shows an example of an arrangement of lens apertures.

Another example of a two-dimensional lens array of the delta arrangement depicted in FIG. 13b is shown in FIG. 16.

The first lens aperture 11a is an ellipse. The second lens aperture 12a comprises arcs which are defined by portions of an ellipse and straight lines serving as boundary lines. The other features of this lens array are the same as those of the lens array shown in FIG. 15. The lenses are of astigmatism.

Figure 13C:
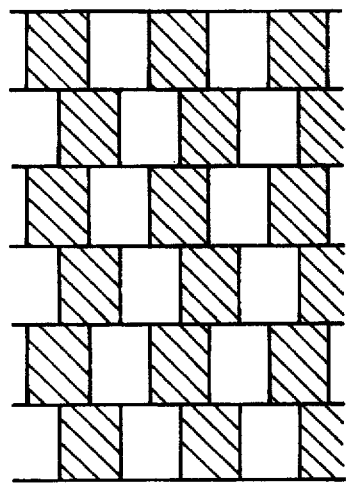
Figure 13D:
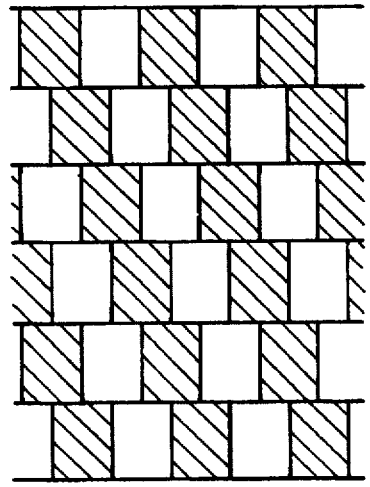
Figure 17:
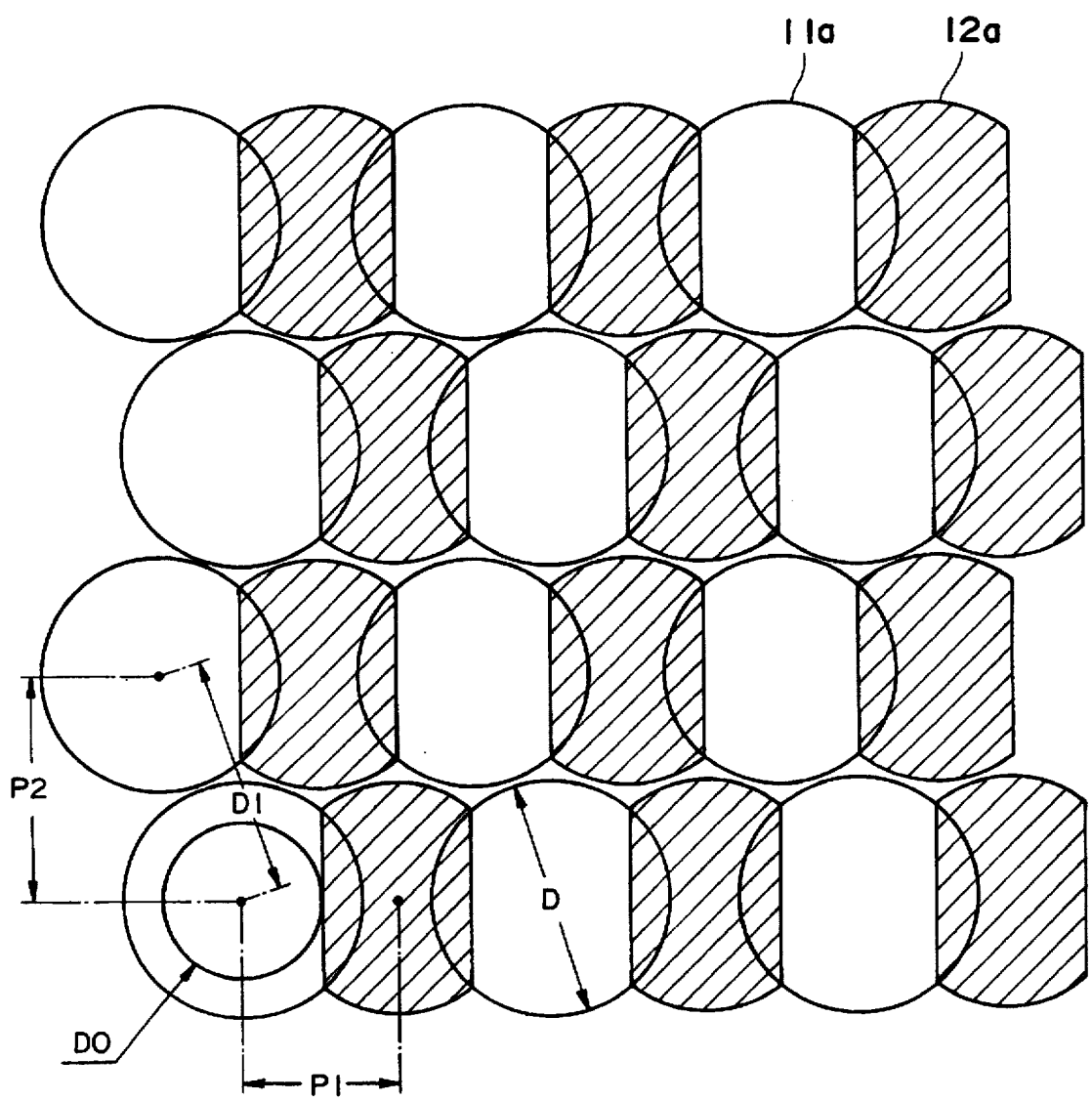
FIG. 17 shows an example of an arrangement of lens apertures.

FIG. 17 shows a two-dimensional lens array of a type of the delta arrangement depicted in FIG. 13c. This lens array is constituted by arranging a plurality of the one-dimensional lens arrays shown in FIG. 7 in parallel.

The first lens aperture 11a is a circle which has such a diameter that the first lens apertures overlap (contact) with the second lens apertures 12a, but do not overlap (contact) with each other. The diameter D of the first lens aperture 11a is expressed as follows:

$$D0 < D < D1 \qquad \text{Eg. (6)}$$

where $$D0 = P1, \qquad \text{Eg. (7)}$$

and $$D1 = [(P½)^2 + P2^2]^{1/2} \quad \text{Eg. (8)}$$

The second lens aperture 12a comprises arcs and straight lines. The arcs are part of a circle having almost the same diameter as that of the first lens aperture 11a. The straight lines define the boundaries between the first and second lens apertures 11a and 12a, each of which connects ends of the arcs.

There is a very small spacing or gap between the rows of lenses. Of course, the spacing is not necessarily needed. However this arrangement has an advantage that the two-dimensional lens array is fabricated by two melting stages in comparison with the arrangement shown in FIG. 15.

Figure 18:
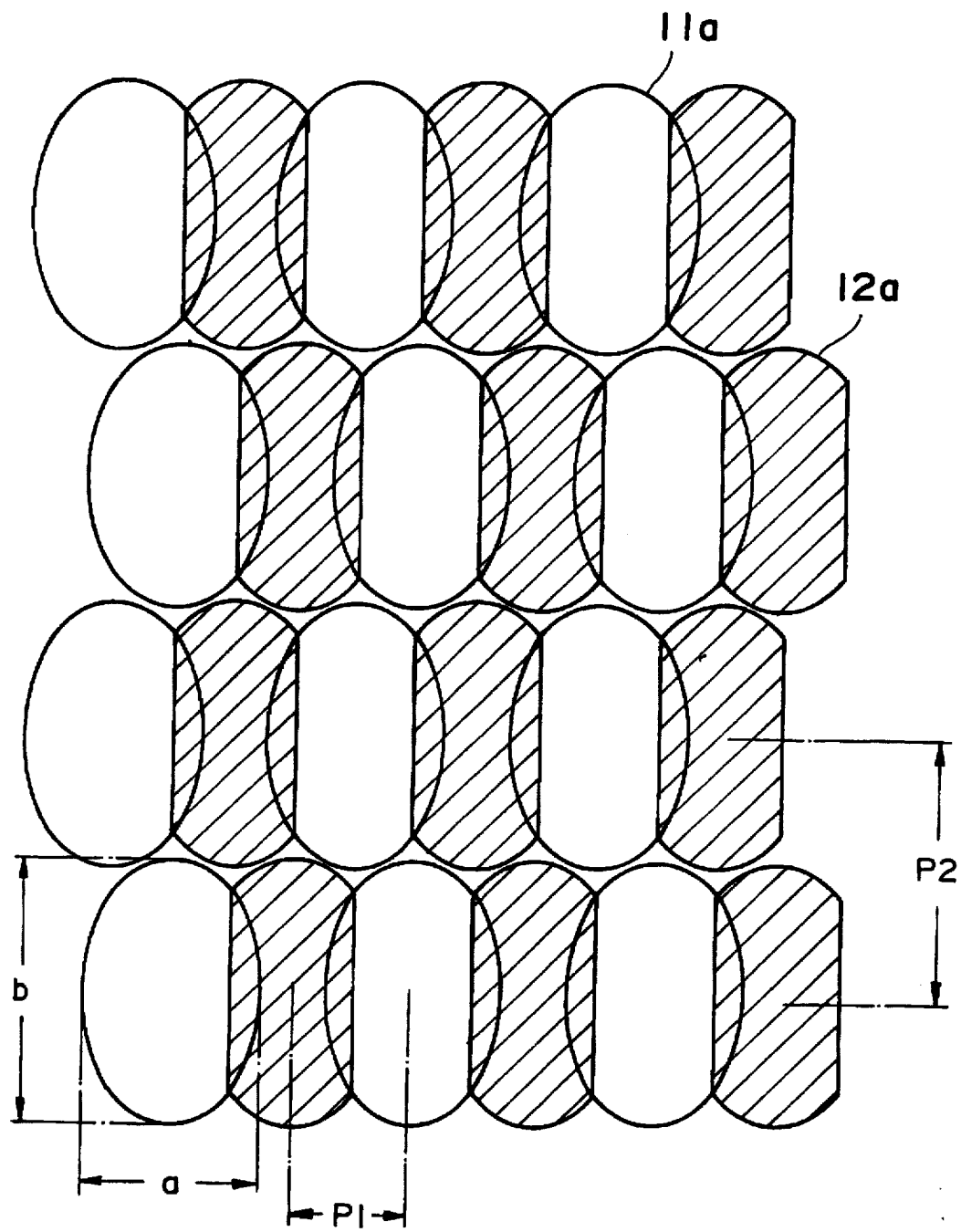
FIG. 18 shows an example of an arrangement of lens apertures.

FIG. 18 shows another example of a two-dimensional lens array of the delta arrangement depicted in FIG. 13c.

The first lens aperture 11a is an ellipse, the size of the first lens aperture is so determined that the first lens aperture 11a overlaps (contact) with the second lens aperture 12a, but the first lens apertures 11a do not contact with each other. That is, the minor axis a and major axis b are defined as follows:

$$a > P1 \quad \text{Eg. (9)}$$

$$b < (2aP2)/[4a^2 - P1^2] \quad \text{Eg. (10)}$$

The second lens aperture 12a is constituted by arcs which are parts of an ellipse the size of which is almost same as that of the first lens aperture, and straight lines defining the boundaries between the first and second lens apertures 11a and 12a, each of which connects ends of the arcs.

The lenses of this two-dimensional lens array have a nature of astigmatism.

Figure 13E:
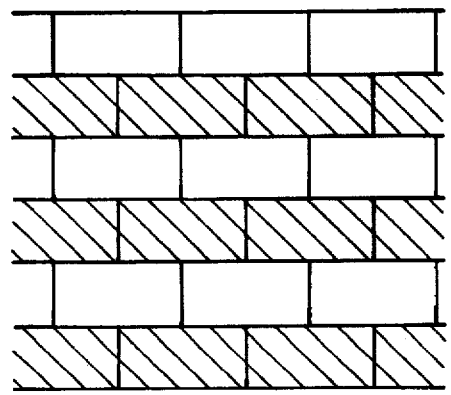
Figure 19:
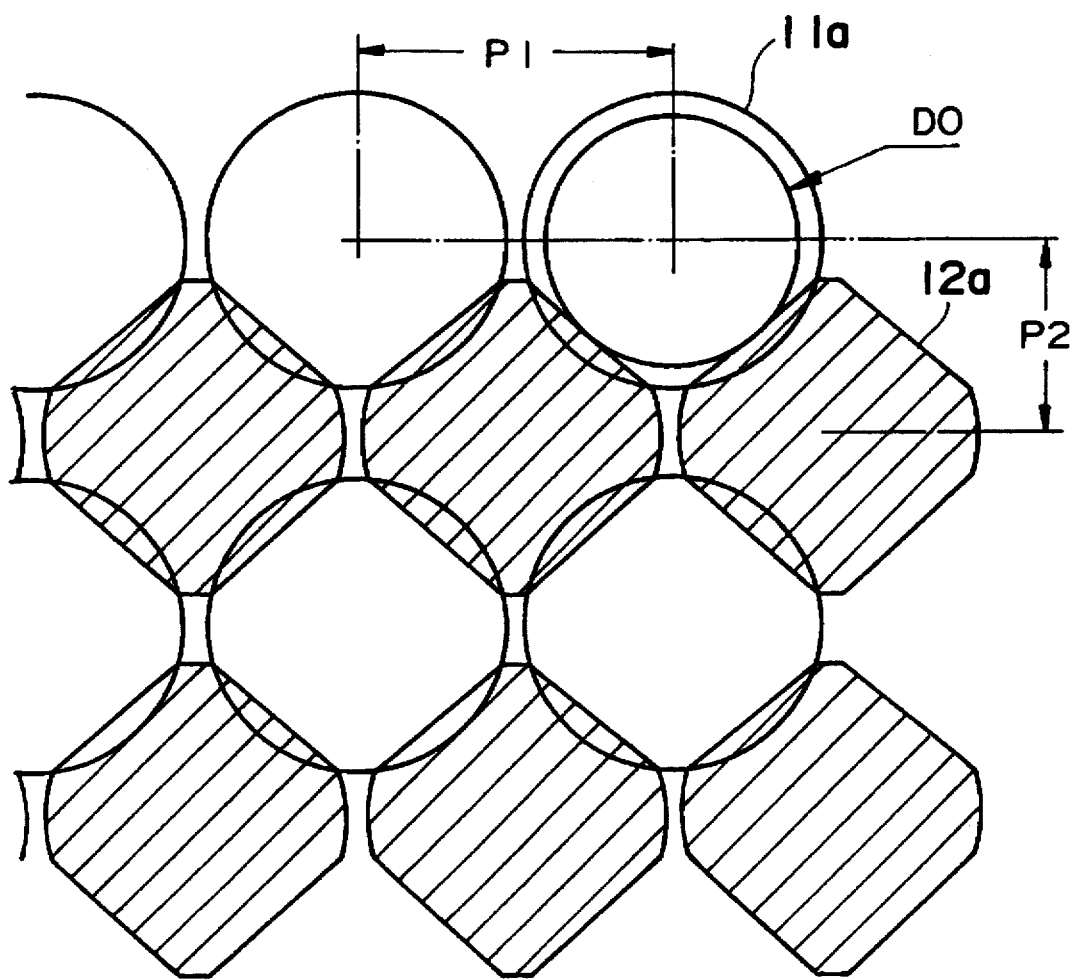
FIG. 19 shows an example of an arrangement of lens apertures.

A two-dimensional lens array shown in FIG. 19 has a delta arrangement as depicted in FIG. 13e.

The first lens aperture 11a has a shape of a circle. The size of the circle is determined such that the first lens apertures 11a partly overlap (contact) with the second lens apertures 12a but the first lens apertures are not made to contact with each other. This condition is expressed as follows:

$$D0 < D < D1 \quad \text{Eg. (11)}$$

where D is a diameter of the circle defining the contour of the first lens aperture 11a, and $$D0 = [(P½)^2 + P2^2]^{1/2} \quad \text{Eg. (12)}$$

$$D1 = P1 \quad \text{Eg. (13)}$$

The second lens aperture 12a has a shape like a rhombus, constituted by arcs and straight lines. Arcs are parts of a circle having almost the same diameter as that of the circle defining the first lens aperture and are drawn in a region outside the first lens aperture 11a. The straight lines appear in the region inside the first lens aperture 11a and connect ends of the arcs. The straight lines are boundary lines between the first and second lens apertures 11a and 12a.

The remarkable features of this arrangement are that a spacing (gap) between the first lens apertures or between the second lens apertures is very small, and that the lenses have no aberration or less aberration and that two melting stages are enough to fabricate this lens array.

Figure 20:
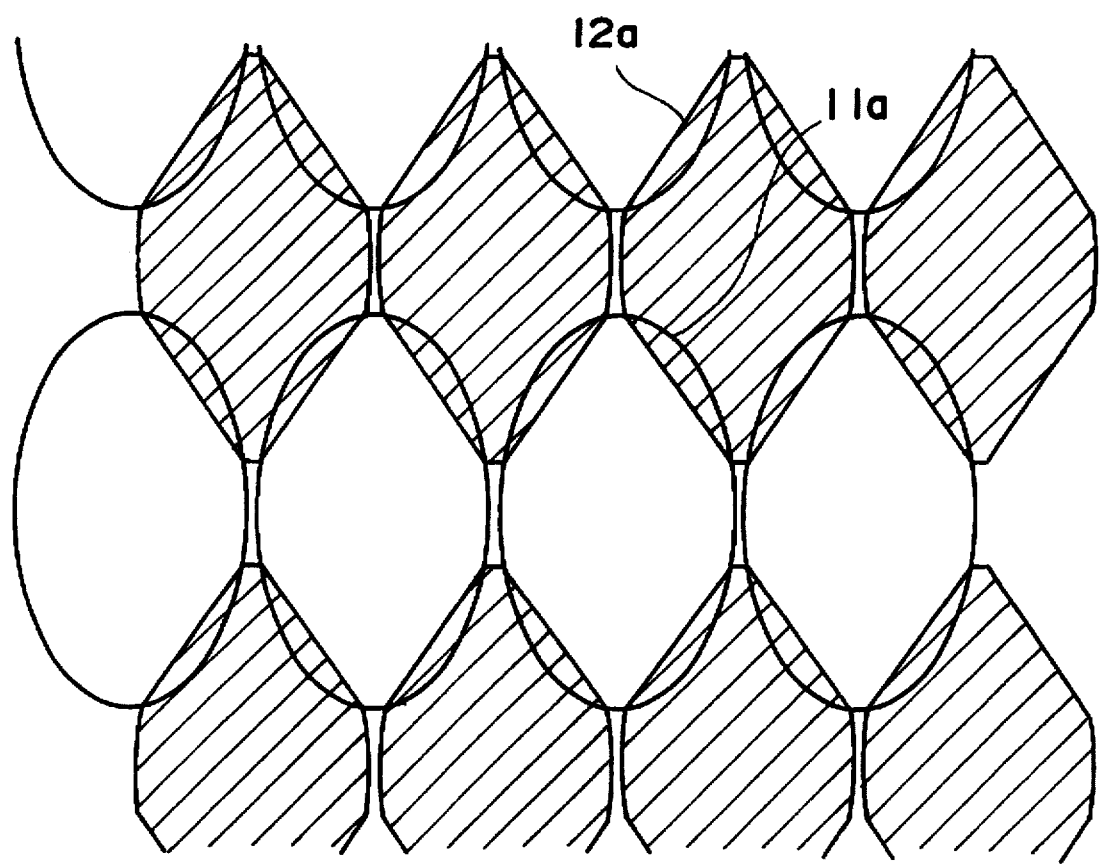
FIG. 20 shows an example of an arrangement of lens apertures.

FIG. 20 shows an another structure of a two dimensional lens array of a type of the delta arrangement shown in FIG. 13c or 13e.

A point which is different from the feature shown in FIG. 19 is that the first lens aperture is an ellipse. The lens array includes lenses which produce astigmatism.

Applications of a One- or Two-Dimensional Lens Array

Many applications of the one- or two-dimensional lens arrays described above are conceivable.

Figure 21:
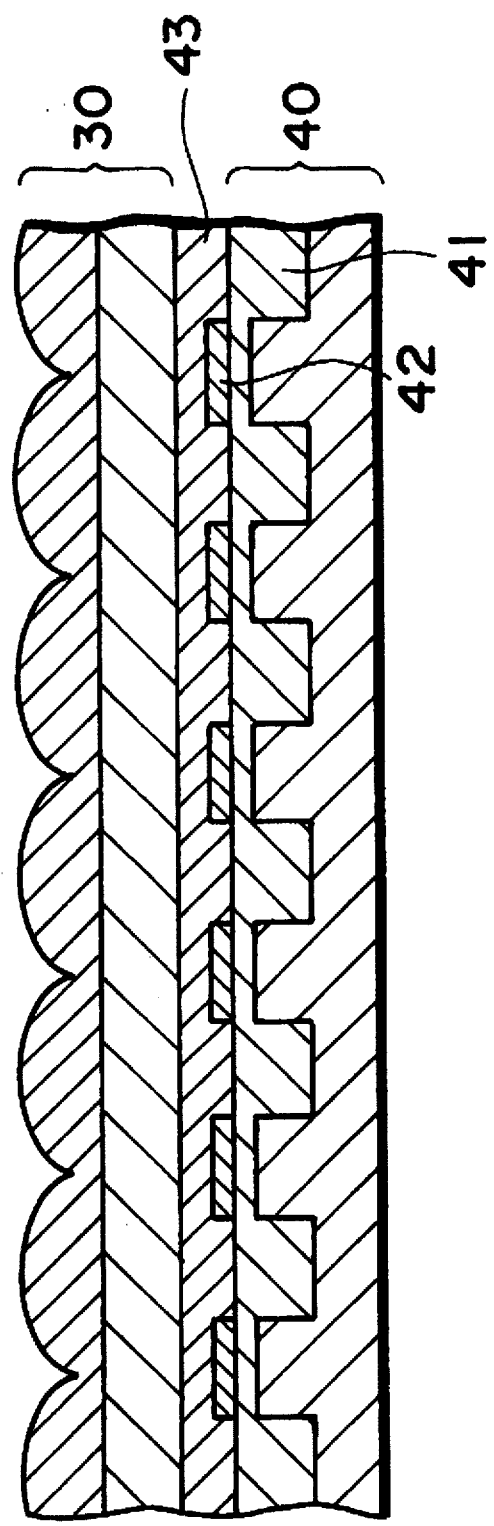
FIG. 21 is a sectional view showing an imaging apparatus.

FIG. 21 schematically illustrates an imaging device.

A charge-coupled device (CCD) 40 includes many photodiode elements 41 and electrodes 42 for driving the CCD 40. The arrangement of the photodiode elements 41 may be the regular (mosaic) arrangement or delta arrangement. One type of the two-dimensional lens arrays described above suitable for the arrangement of the photodiode elements is used. The two-dimensional lens array 30 is disposed on the CCD 40 via an intermediate transparent layer 43 therebetween. Each of the lenses of the lens array 30 corresponds to each of the photodiode elements 41 of the CCD 40.

Figure 22:
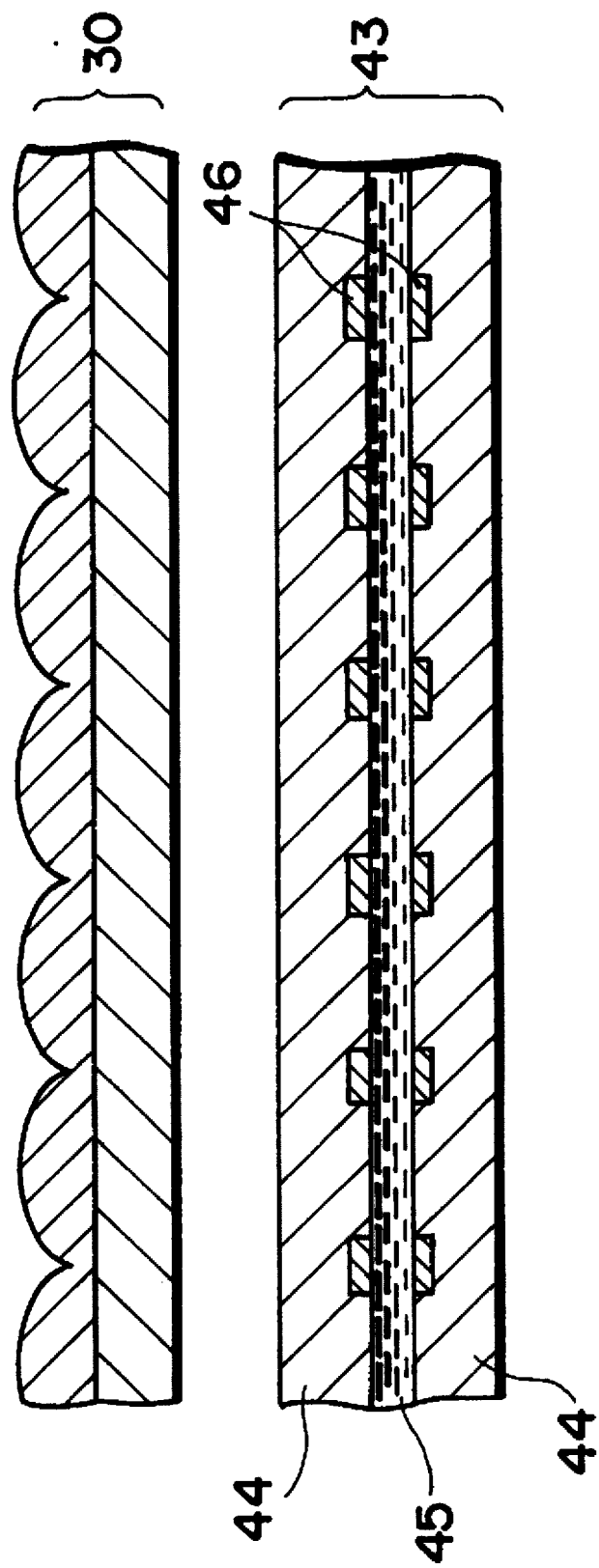
FIG. 22 is a sectional view showing a display apparatus.

Application of the two-dimensional lens array to a light-crystal panel is depicted in FIG. 22. As well known, a liquid-crystal panel 43 comprises two glass substrates 44 arranged with a small spacing therebetween and a liquid-crystal 45 filling the gap between the glass substrates 44. Scanning electrodes, signal electrodes and light-shielding films 46 (these are assigned to same reference numeral for convenience) are formed on the surfaces of the glass substrates 44. A region enclosed by these electrodes 46 is called a pixel (or an aperture). A pixel electrode is not shown. The lens array 30 is disposed so as to face the liquid-crystal panel 43 and each microlens of the lens array 30 corresponds to the pixel of the liquid-crystal panel 30.

Figure 23:
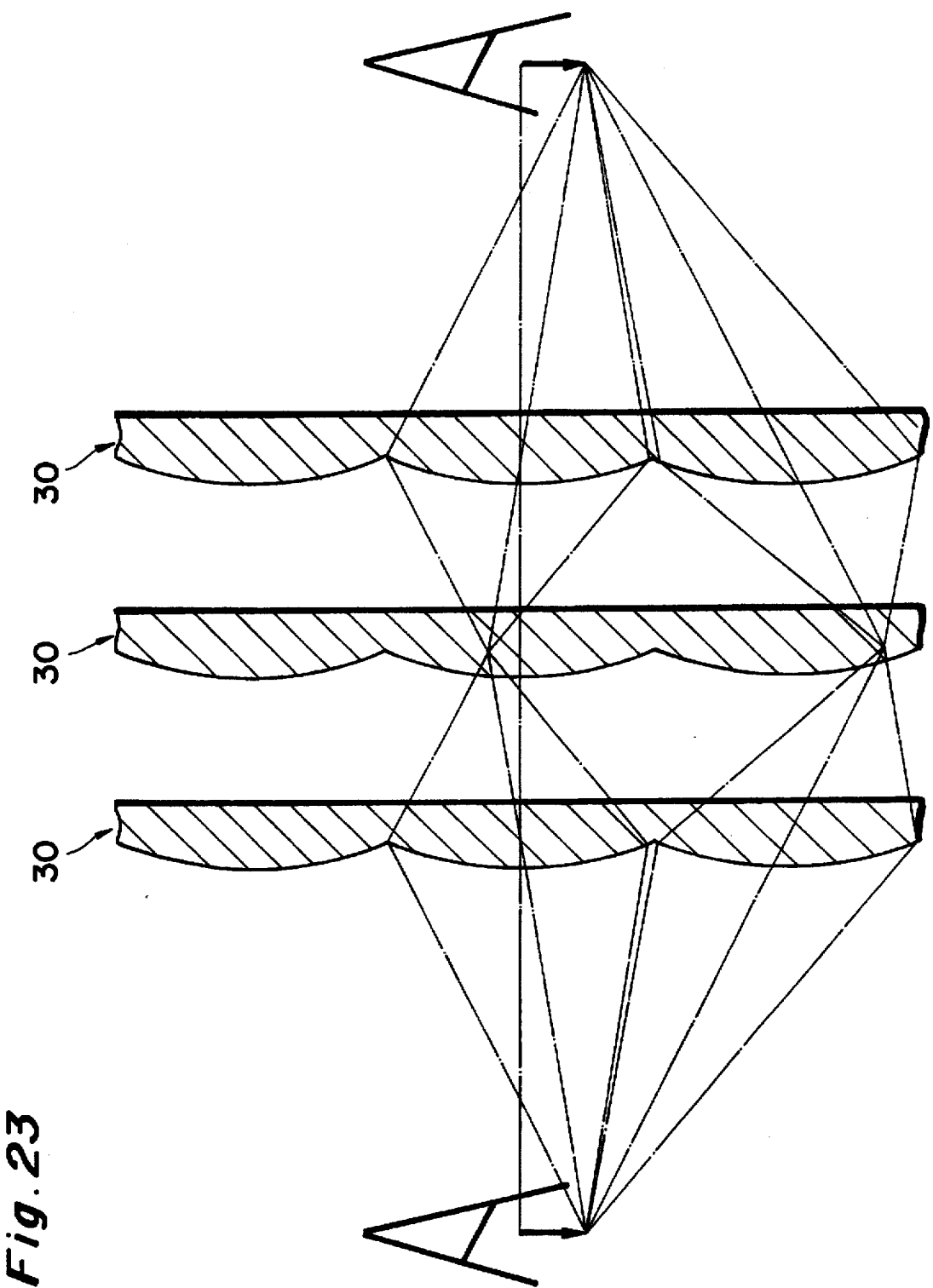
FIG. 23 is a sectional view showing an image forming device.

FIG. 23 shows an image forming device using three two-dimensional (or one-dimensional) lens arrays 30 to form an erect image.

Figure 24:
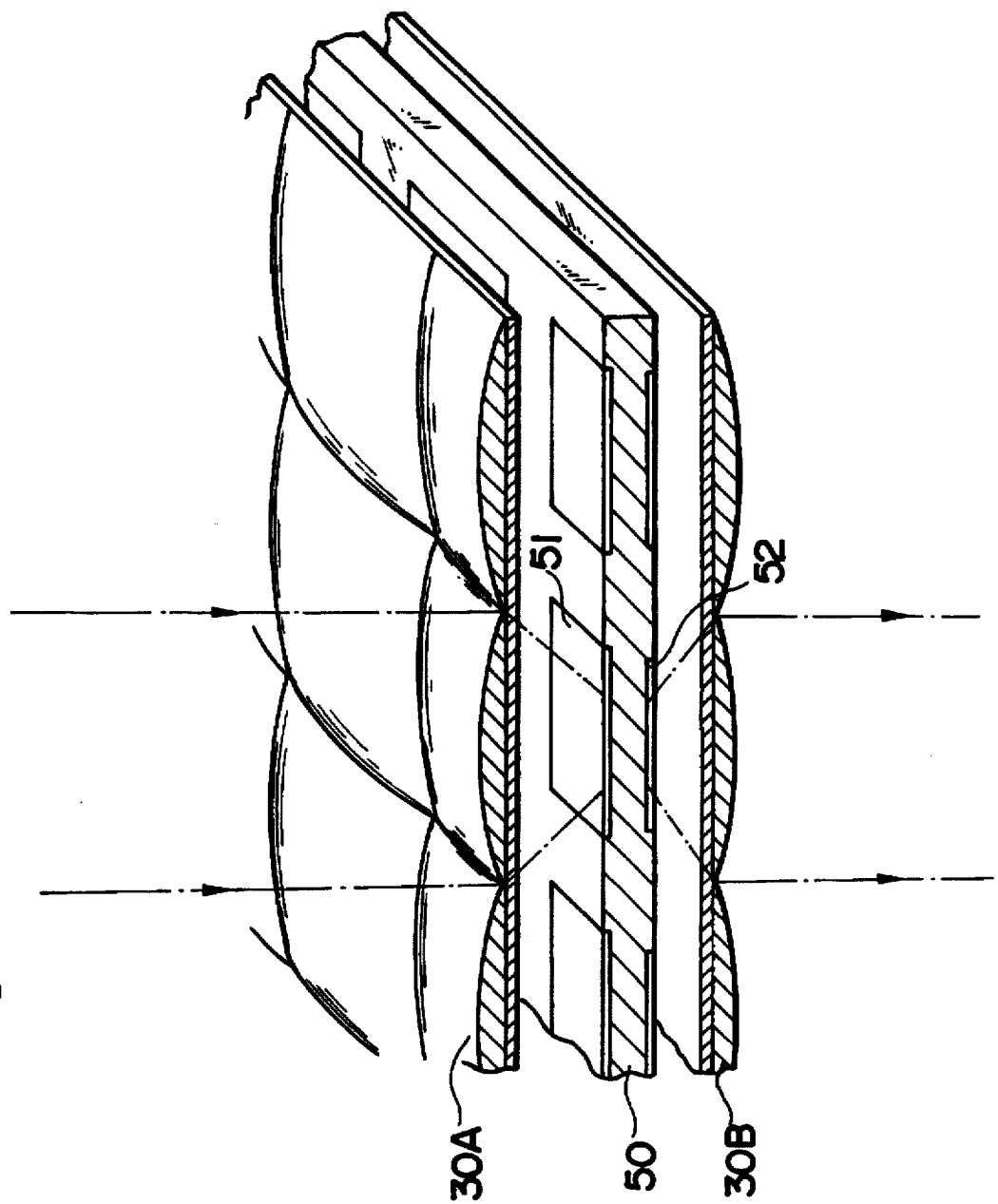
FIG. 24 is a partially cut-away perspective view showing an optical information processing device.

FIG. 24 shows an optical information processing device with use of two-dimensional lens arrays.

A spatial modulating device or memory 50 includes a plurality of openings or light receiving elements 51 on one surface thereof and a plurality of openings or light emitting elements 52 on the other surface thereof, these openings or elements being arranged in a mosaic or delta arrangement. Two lens arrays 30A and 30B are disposed above and below the device 50. The lenses of the lens arrays 30A and 30B correspond to the openings or elements 51 and 52. Light focused by the lens of the lens array 30A impinges upon the corresponding opening or element 51 of the device 50. Light emitted from the opening or element 52 is collimated by the corresponding lens of the lens array 30B.

Figure 25:
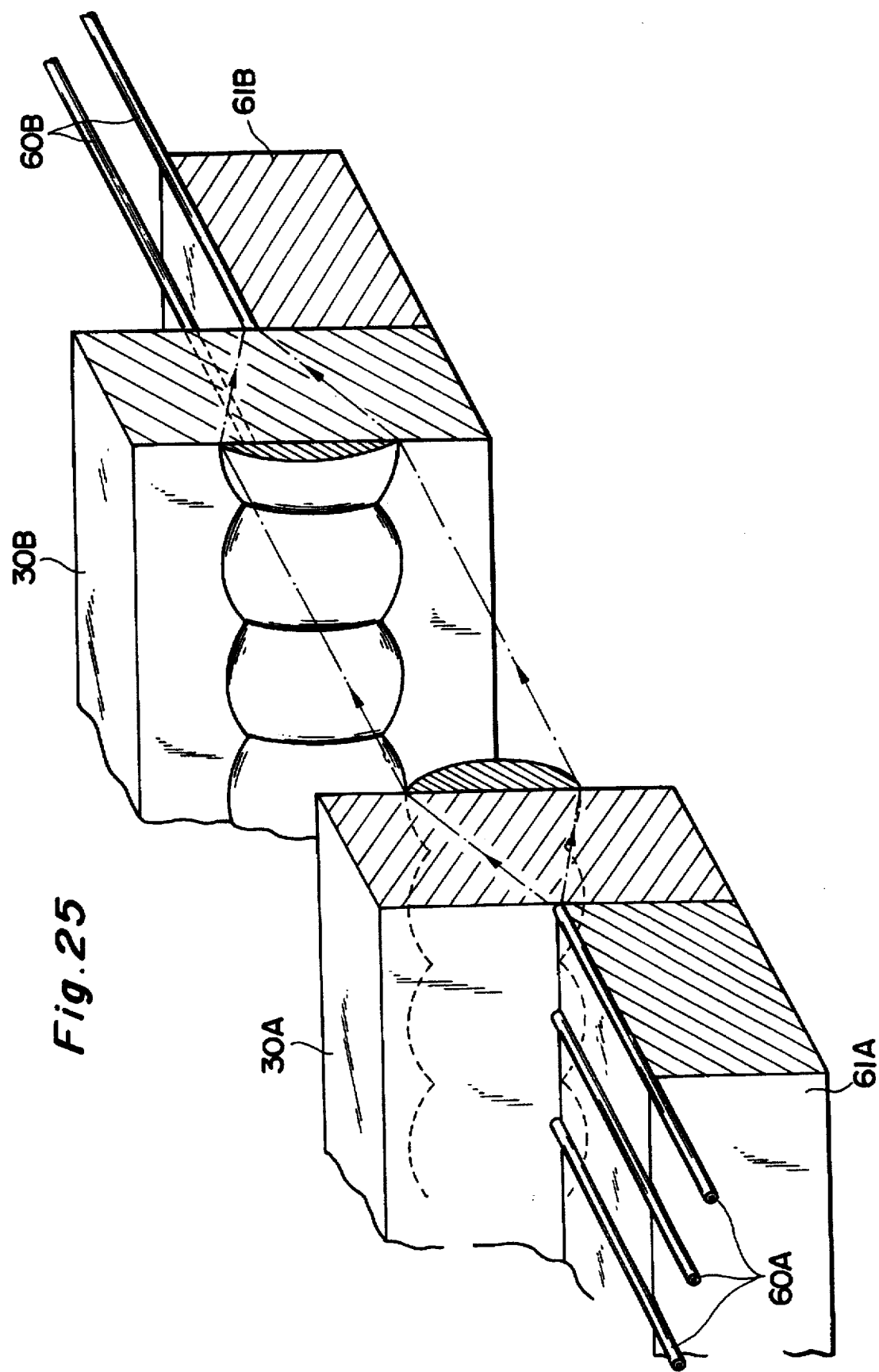
FIG. 25 is a partially cut-away perspective view showing an optical coupling device.

FIG. 25 shows an optical coupling device using one-dimensional lens arrays.

Light beams outputted from optical fibers 60A supported by a support 61A are collimated by the lenses of the lens array 30A. The collimated light beams are focused by the lenses of the lens array 30B to be coupled to the optical fibers 60B fixed to a support 61B.

Further the one- or two-dimensional lens array is used as an optical coupling device for coupling light beams between an array of light emitting elements or light receiving elements and space. For example, many light emitting elements can be arranged on a board two-dimensionally. The light beams emitted from the elements are coupled to lenses of a two-dimensional lens array to be collimated thereby.

As many apparently widely different embodiments of the present invention can be made without departing from the spirit and scope thereof, it is to be understood that the invention is not limited to the specific embodiments thereof except as defined in the appended claims.

What is claimed is:

1. A lens array manufactured by the method comprising the steps of:

forming a first array of first lens-base elements on one side of a substrate with spacing therebetween;

heating the first lens-base elements so that the first lens-base elements melt to form first lenses on the one side of the substrate;

covering the first lenses and the substrate with a first separation layer;

forming a second array of second lens-base elements in a region on the one side of the substrate where the first lenses are not formed so as to partly overlap with the first lenses; and heating the second lens-base elements so that the second lens-elements melt to form second lenses substantially adjacent to the first lenses on the one side of the substrate.

2. A lens array manufactured by the method comprising the steps of:

forming a first array of first lens-base elements on one side of a substrate with spacing therebetween;

heating the first lens-base elements so that the first lens-base elements melt to form first lenses on the one side of the substrate;

forming a second array of second lens-base elements with a material different from that of the first lens-base elements in a region on the one side of the substrate where the first lenses are not formed so as to partly overlap with the first lenses; and heating the second lens-base elements so that the second lens-base elements melt to form second lenses substantially adjacent to the first lenses on the one side of the substrate.

3. A lens array manufactured by the method comprising the steps of:

forming a first array of first lens-base elements on one side of a substrate with spacing therebetween;

heating the first lens-base elements so that the first lens-base elements melt to form first lenses in a lens array on the one side of the substrate;

making a replica of the lens array having the first lenses;

forming a second array of second lens-base elements on the replica in a region on one side of the replica where first lens portions of the replica are not formed so as to partly overlap with the first lens portions of the replica; and heating the second lens-base elements so that the second lens-elements melt to form second lenses substantially adjacent to the first lens portions on the one side of the replica.

4. A lens array manufactured by the method comprising the steps of:

forming an array of lens-base elements on one side of a substrate with spacing therebetween;

heating the lens-base elements so that the lens-base elements melt to form lenses on the one side of the substrate; and repeating the steps of forming and heating the lens-base elements a second time such that additional lens-base elements and additional lenses are formed on the one side of the substrate in a region where the lenses are not formed so as to be substantially adjacent to and to partly overlap with the lenses formed on the one side of the substrate.

5. A lens array manufactured by the method comprising the steps of:

forming a first array of first lens-base elements on one side of a substrate with spacing therebetween;

heating the first lens-base elements so that the first lens-base elements melt to form first lenses on the one side of the substrate;

forming a second array of second lens-base elements in a place on the one side of the substrate lacking the first lenses so as to partly overlap with the first lenses;

heating the second lens-base elements so that the second lens-base elements melt to form second lenses on the one side of the substrate; and repeating the steps of forming and heating the second lens-base elements, if necessary.

6. A lens array manufactured by the method comprising the steps of:

forming a first array of first lens-base elements on one side of a substrate with spacing therebetween;

heating the first lens-base elements so that the first lens-base elements melt to form first lenses on the one side of the substrate;

forming a second array of second lens-base elements in a place on the one side of the substrate lacking the first lenses so as to partly overlap with the first lenses;

heating the second lens-base elements so that the second lens-base elements melt to form second lenses on the one side of the substrate;

repeating the steps of forming and heating the second lens-base elements, if necessary, thereby making a first lens array on the one side of the substrate;

accumulating a stamper material on said first lens array serving as a master plate to form a stamper;

peeling the stamper from the master plate;

filling the stamper with a molten resin;

solidifying the resin in the stamper; and removing the stamper to obtain a second lens array made of the resin.

7. A lens array comprising:

a substrate;

a first array of first lenses arranged on one side of said substrate with spacing portions therebetween on the one side of said substrate; and a second array of second lenses disposed on the spacing portions of the one side of said substrate between the first lenses, the second lenses partly overlapping with the adjacent first lenses on the one side of said substrate.

8. The lens array according to claim 7 further comprising:

a third array of third lenses disposed on spacing portions lacking the first lenses and the second lenses on the one side of said substrate, the third lenses partly overlapping with the adjacent first and second lenses on the one side of said substrate.

9. The lens array according to claim 7 wherein the lens array is a two-dimensional lens array.

10. The lens array according to claim 7 wherein the lens array is a one-dimensional lens array.

11. An imaging apparatus with use of the lens array as defined in claim 7 comprising:

an imaging device having a plurality of photo-sensitive elements; and the lens array disposed so as to face the imaging device, each lens of the lens array corresponding to each photo-sensitive elements.

12. A display apparatus of dot-matrix type with use of the lens array as defined in claim 7 comprising:

a display device of dot-matrix type having an array of display elements; and the lens array disposed so as to face the display device, each lens of the lens array corresponding to each display element.

13. An image forming device including the lens array as defined in claim 7.

14. An optical information processing apparatus with use of the lens array as defined in claim 7 comprising:

a plurality of optical modulating elements; and the lens array the lenses of which correspond to the optical modulating elements.

15. An optical coupling device with use of the lens array as defined in claim 7 comprising:

a plurality of light input/output portions; and the lens array the lenses of which correspond to the light input/output portions.

16. The lens array according to claim 7, wherein the adjacent first and second lenses are substantially formed in a plane, said lenses substantially covering said substrate on the one side of said substrate and having round surface portions which are exposed to incident light, wherein the light incident on said plane is refracted on said round surface portions.

17. The lens array according to claim 8, wherein the adjacent first, second, and third lenses are substantially formed in a plane, said lenses substantially covering said substrate on the one side of said substrate and having round surface portions which are exposed to incident light, wherein the light incident on said plane is refracted on said round surface portions.

* * * * *